(12) United States Patent
Kang et al.

(10) Patent No.: US 10,671,158 B2
(45) Date of Patent: Jun. 2, 2020

(54) THREE-DIMENSIONAL (3D) RENDERING METHOD AND APPARATUS FOR USER' EYES

(71) Applicant: SAMSUNG ELECTRONICS CO., LTD., Suwon-si (KR)

(72) Inventors: Byong Min Kang, Yongin-si (KR); Dong Kyung Nam, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/672,467

(22) Filed: Aug. 9, 2017

(65) Prior Publication Data

US 2018/0143683 A1 May 24, 2018

(30) Foreign Application Priority Data

Nov. 22, 2016 (KR) .................. 10-2016-0155756

(51) Int. Cl.
| | |
|---|---|
| *G06F 3/01* | (2006.01) |
| *H04N 13/117* | (2018.01) |
| *H04N 13/371* | (2018.01) |
| *H04N 13/376* | (2018.01) |
| *H04N 13/305* | (2018.01) |
| *H04N 13/312* | (2018.01) |
| *G06F 3/0481* | (2013.01) |
| *H04N 13/383* | (2018.01) |

(Continued)

(52) U.S. Cl.
CPC .......... *G06F 3/013* (2013.01); *G06F 3/04815* (2013.01); *H04N 13/117* (2018.05); *H04N 13/305* (2018.05); *H04N 13/312* (2018.05); *H04N 13/371* (2018.05); *H04N 13/376* (2018.05); *H04N 13/383* (2018.05); *G06F 17/10* (2013.01); *G06T 15/20* (2013.01); *G06T 19/20* (2013.01)

(58) Field of Classification Search
CPC .......... G06F 1/163; G06F 3/005; G06F 3/013
See application file for complete search history.

(56) References Cited

U.S. PATENT DOCUMENTS

| | | |
|---|---|---|
| 6,697,761 B2 | 2/2004 | Akatsuka et al. |
| 6,962,289 B2 | 11/2005 | Vatan et al. |

(Continued)

FOREIGN PATENT DOCUMENTS

| | | |
|---|---|---|
| EP | 0596868 B1 | 9/1998 |
| JP | 3992045 B2 | 10/2007 |

(Continued)

OTHER PUBLICATIONS

S. Malassiotis and M.G. Strintzis: "Pose and Illumination Compensation for 3D Face Recognition", Informatics and Telematics Institute, Oct. 24-27, 2004, (4 pages total).

(Continued)

*Primary Examiner* — Md Saiful A Siddiqui
(74) *Attorney, Agent, or Firm* — Sughrue Mion, PLLC

(57) ABSTRACT

Provided are a three-dimensional (3D) rendering method and apparatus that detect eye coordinates of positions of eyes of a user from an image of the user, adjust the eye coordinates to correspond to virtual eye positions that reduce crosstalk caused by refraction of light; and perform 3D rendering of the eyes based on the adjusted eye coordinates.

28 Claims, 17 Drawing Sheets

(51) Int. Cl.
*G06F 17/10* (2006.01)
*G06T 15/20* (2011.01)
*G06T 19/20* (2011.01)

(56) References Cited

U.S. PATENT DOCUMENTS

| | | | |
|---|---|---|---|
| 8,890,865 B2 | 11/2014 | Park et al. | |
| 2006/0077558 A1* | 4/2006 | Urakawa | A61B 3/0008 |
| | | | 359/630 |
| 2009/0123030 A1* | 5/2009 | De La Barre | H04N 13/376 |
| | | | 382/103 |
| 2013/0181895 A1* | 7/2013 | Kim | G09G 3/34 |
| | | | 345/156 |
| 2014/0152556 A1 | 6/2014 | Ohbitsu | |
| 2015/0145970 A1* | 5/2015 | Kim | H04N 13/32 |
| | | | 348/54 |
| 2016/0005176 A1* | 1/2016 | Nguyen | G06F 3/013 |
| | | | 382/103 |
| 2016/0163108 A1* | 6/2016 | Kim | G02B 27/0101 |
| | | | 345/633 |
| 2016/0261316 A1 | 9/2016 | Bai et al. | |
| 2017/0068315 A1 | 3/2017 | Kang et al. | |
| 2017/0160518 A1* | 6/2017 | Lanman | G06F 3/011 |
| 2018/0063502 A1* | 3/2018 | Ogawa | H04N 13/167 |

FOREIGN PATENT DOCUMENTS

| | | |
|---|---|---|
| JP | 201164894 A | 3/2011 |
| KR | 100372933 B1 | 3/2003 |
| KR | 101348723 B1 | 1/2014 |
| KR | 101407639 B1 | 6/2014 |
| KR | 1020140100289 A | 8/2014 |
| WO | 2016152217 A1 | 9/2016 |

OTHER PUBLICATIONS

K. Huh and M. Kim: "3D Display Method for Moving Viewers", Dept. of Electronic Eng Dankook University, 2000, pp. 211-219, (9 pages total).
Kim et al: "Eye Localization based on Multi-Scale Gabor Feature Vector Model", 2007, vol. 7, No. 1, pp. 48-57, (10 pages total).
Jung et al: "Numerical simulation of the displayed image on the entire screen of autostereoscopic displays", Mar. 18, 2015, vol. 23, No. 6, Optics Express, pp. 7842-7855, (14 pages total).
Hoffman, J., "The geometrical meaning of the paraxial approximation of Snell's law and visualizing its accuracy", 2000, European Journal of Physics, 6 pages total, XP 055489612, http://iopscience.iop.org/article/10.1088/0143-0807/21/1/309/pdf.
Communication dated Jul. 10, 2018, issued by the European Patent Office in counterpart European Patent Application No. 17201909.3.
Communication dated Mar. 19, 2018, from the European Patent Office in counterpart European Application No. 17201909.3.

* cited by examiner

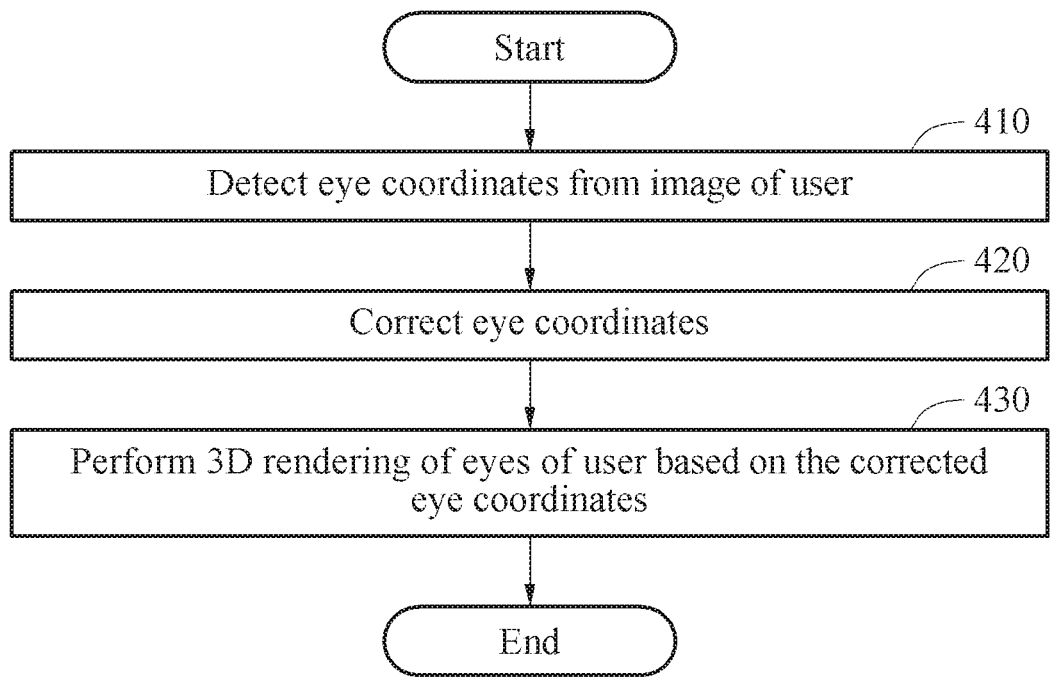

1000

1100

FIG. 14A
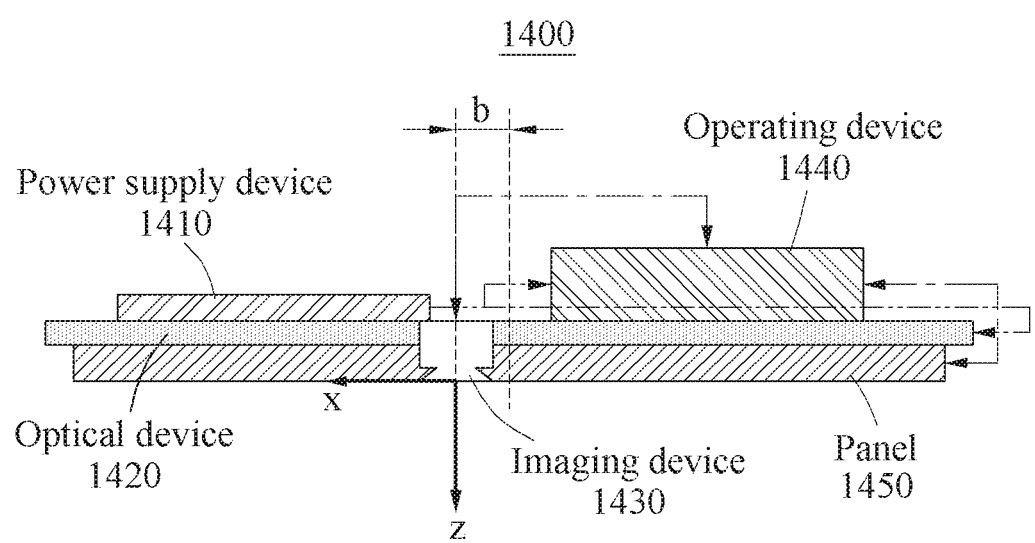

THREE-DIMENSIONAL (3D) RENDERING METHOD AND APPARATUS FOR USER' EYES

CROSS-REFERENCE TO RELATED APPLICATION

This application claims priority from Korean Patent Application No. 10-2016-0155756, filed on Nov. 22, 2016, in the Korean Intellectual Property Office, the disclosure of which is incorporated herein by reference in its entirety.

BACKGROUND

1. Field

Methods and apparatuses consistent with exemplary embodiments relate to a rendering method and apparatus, and more particularly, to a three-dimensional (3D) rendering method and apparatus for user's eyes.

2. Description of the Related Art

Related art commercial three-dimensional (3D) display apparatuses use a principle of providing a stereoscopic effect or depth by displaying different images to both eyes of a user. Typically, a left image for a left eye may be displayed to the left eye, and a right image for a right eye may be displayed to the right eye. However, for various reasons, including, but not limited to, refraction of light through the display panel, crosstalk may occur to allow a right image for a right eye to be shown in a left eye and allow a left image for the left eye to be shown in the right eye. Due to the crosstalk, an image quality of a display apparatus may be degraded. Generally, crosstalk occurring in a display may be solved when 3D rendering is performed by applying a Snell's law. However, because an amount of calculation increases due to a complex trigonometric function used in the Snell's law, it may be difficult to implement 3D rendering in real time in an apparatus with a low performance.

SUMMARY

Exemplary embodiments may address at least the above problems and/or disadvantages and other disadvantages not described above. Also, the exemplary embodiments are not required to overcome the disadvantages described above, and an example embodiment may not overcome any of the problems described above.

According to an exemplary embodiment, there is provided a three-dimensional (3D) rendering method comprising: detecting eye coordinates of positions of eyes of a user from an image of the user; adjusting the eye coordinates to correspond to virtual eye positions that reduce crosstalk caused by refraction of light; and performing 3D rendering of the eyes based on the adjusted eye coordinates.

The adjusting of the eye coordinates may comprise adjusting the eye coordinates within an interpupillary distance (IPD) corresponding to an allowable range for an error in the positions of the eyes.

The adjusting of the eye coordinates may comprise: applying a Snell's law formula to first pixels that are a portion of pixels in a single frame corresponding to the eye coordinates; and adjusting the eye coordinates based on a result of the applying of the Snell's law formula to the first pixels.

The adjusting of the eye coordinates based on the result of the applying may comprise: calculating a first result value by applying the Snell's law formula to the first pixels; calculating a second result value by applying a paraxial approximation to the first pixels; and adjusting the eye coordinates based on a difference between the first result value and the second result value.

The adjusting of the eye coordinates may comprise: determining an evaluation function based on a difference between the first result value and the second result value; calculating the virtual eye positions to minimize the evaluation function; and adjusting the eye coordinates based on the virtual eye positions.

The first pixels comprise pixels located at a side of a 3D display.

The adjusting of the eye coordinates may comprise adjusting the eye coordinates based on at least one of a first function defined in advance to adjust X coordinates among the eye coordinates, a second function defined in advance to adjust Z coordinates among the eye coordinates, and a lookup table that stores adjust eye coordinates corresponding to the eye coordinates in advance.

The first function may be configured to adjust the X coordinates based on a first parameter that changes based on the Z coordinates and a second parameter that is based on a distance between an image sensor and a central portion of a screen of a 3D display.

The first parameter may have a value less than or equal to 1, and when a distance between the eyes and the screen of the 3D display decreases, the first parameter may decrease, and when the distance between the eyes and the screen increases, the first parameter may increase.

The second function may be configured to adjust the Z coordinates based on a third parameter and a fourth parameter that change based on the X coordinates, and when the eyes move towards a side of a screen of a 3D display, the third parameter may decrease, when the eyes move towards a central portion of the screen, the third parameter may increase, when the eyes move towards the central portion of the screen, the third parameter may have a value close to 1, when the eyes move towards a side of a screen of a 3D display, the fourth parameter may increase, when the eyes move towards a central portion of the screen, the fourth parameter may decrease, and when the eyes move towards a central portion of the screen, the fourth parameter may have a value close to 0.

The detecting of the eye coordinates may comprises: acquiring a face image of the user using an image sensor of a mobile apparatus; and detecting the eye coordinates based on the image sensor by tracking a viewpoint of the face image.

According to an exemplary embodiment, there is provided a non-transitory computer-readable storage medium storing a program for causing a processor to perform a method comprising: detecting eye coordinates of positions of eyes of a user from an image of the user; adjusting the eye coordinates to correspond to virtual eye positions that reduce crosstalk caused by refraction of light; and performing 3D rendering of the eyes based on the adjusted eye coordinates.

According to an exemplary embodiment, there is provided a three-dimensional (3D) rendering apparatus comprising: an image sensor configured to detect eye coordinates of positions of eyes of a user from an image of the user; and a processor configured to: adjust the eye coordinates to correspond to virtual eye positions that reduce crosstalk caused by refraction of light, and perform 3D rendering of the eyes based on the adjusted eye coordinates.

The processor may be further configured to adjust the eye coordinates within an interpupillary distance (IPD) corresponding to an allowable range for an error in the positions of the eyes.

The processor may be further configured to: apply a Snell's law formula to first pixels that are a portion of pixels in a single frame corresponding to the eye coordinates; and adjust the eye coordinates based on a result of the application of the Snell's law formula to the first pixels.

The processor may be further configured to: calculate a first result value by applying the Snell's law formula to the first pixels; calculate a second result value by applying a paraxial approximation to the first pixels; and adjust the eye coordinates based on a difference between the first result value and the second result value.

The processor may be further configured to: determine an evaluation function based on a difference between the first result value and the second result value; calculate the virtual eye positions to minimize the evaluation function; and adjust the eye coordinates based on the virtual eye positions.

The first pixels may comprise pixels located at a side of a 3D display.

The processor may be further configured to: adjust the eye coordinates based on at least one of a first function defined in advance to adjust X coordinates among the eye coordinates, a second function defined in advance to adjust Z coordinates among the eye coordinates, and a lookup table that stores adjusted eye coordinates corresponding to the eye coordinates in advance.

The first function may be configured to adjust the X coordinates based on a first parameter that changes based on the Z coordinates and a second parameter that is based on a distance between an image sensor and a central portion of a screen of a 3D display.

The first parameter may have a value less than or equal to 1, and when a distance between the eyes and the screen of the 3D display decreases, the first parameter may decrease, and when the distance between the eyes and the screen increases, the first parameter may increase.

The second function may be configured to adjust the Z coordinates based on a third parameter and a fourth parameter that change based on the X coordinates, and when the eyes move towards a side of a screen of a 3D display, the third parameter may decrease, when the eyes move towards a central portion of the screen, the third parameter may increase, when the eyes move towards the central portion of the screen, the third parameter may have a value close to 1, when the eyes move towards a side of a screen of a 3D display, the fourth parameter may increase, when the eyes move towards a central portion of the screen, the fourth parameter may decrease, and when the eyes move towards a central portion of the screen, the fourth parameter may have a value close to 0.

The image sensor may be configured to acquire a face image of the user, and the processor may be further configured to detect the eye coordinates based on the image sensor by tracking a viewpoint of the face image.

The 3D rendering apparatus may be a mobile apparatus.

According to an exemplary embodiment, there is provided a three-dimensional (3D) rendering method comprising: receiving eye coordinates of positions of eyes of a user from an image of the user; generating adjusted eye coordinates based on refraction of light passing through a panel from a backlight unit; and performing 3D rendering of the eyes based on the adjusted eye coordinates.

The generating the adjusted eye coordinates may comprise: applying a Snell's law formula to first pixels that are a portion of pixels in a single frame corresponding to the eye coordinates; and generating the adjusted eye coordinates by adjusting the eye coordinates based on a result of the applying of the Snell's law formula to the first pixels.

The generating the adjusted eye coordinates may comprise: calculating a first result value by applying the Snell's law formula to the first pixels; calculating a second result value by applying a paraxial approximation to the first pixels; and adjusting the eye coordinates based on a difference between the first result value and the second result value.

According to an exemplary embodiment, there is provided a three-dimensional (3D) rendering apparatus comprising: a processor configured to: receive eye coordinates of positions of eyes of a user from an image of the user; generate adjusted eye coordinates based on refraction of light passing through a panel from a backlight unit; and perform 3D rendering of the eyes based on the adjusted eye coordinates.

The processor may be further configured to: apply a Snell's law formula to first pixels that are a portion of pixels in a single frame corresponding to the eye coordinates; and generate the adjusted eye coordinates by adjusting the eye coordinates based on a result of the applying of the Snell's law formula to the first pixels.

The processor may be further configured to: calculate a first result value by applying the Snell's law formula to the first pixels; calculate a second result value by applying a paraxial approximation to the first pixels; and adjust the eye coordinates based on a difference between the first result value and the second result value.

BRIEF DESCRIPTION OF THE DRAWINGS

The above and other aspects of exemplary embodiments will become apparent and more readily appreciated from the following detailed description of certain exemplary embodiments, taken in conjunction with the accompanying drawings of which:

FIG. 4 is a flowchart illustrating a 3D rendering method according to an exemplary embodiment;

FIGS. 14A and 14B are diagrams illustrating a mobile apparatus as a 3D rendering apparatus according to an exemplary embodiment.

DETAILED DESCRIPTION

Figure 1:
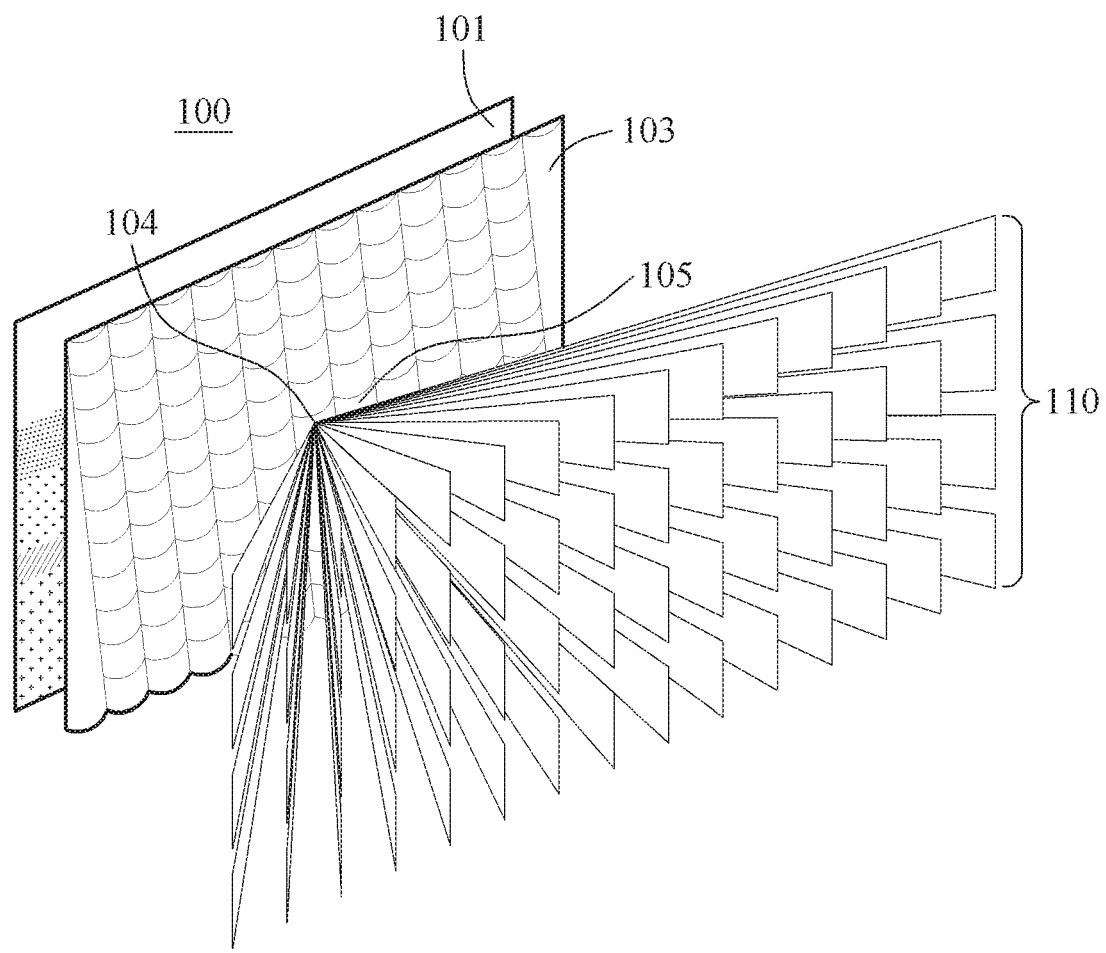
FIG. 1 is a diagram illustrating an operation of a three-dimensional (3D) rendering apparatus according to an exemplary embodiment.

Reference will now be made in detail to exemplary embodiments, examples of which are illustrated in the accompanying drawings, wherein like reference numerals refer to the like elements throughout. Exemplary embodiments are described below in order to explain the present disclosure by referring to the figures.

Hereinafter, exemplary embodiments will be described in detail with reference to the accompanying drawings, and like reference numerals refer to the like elements throughout. In the following description, exemplary embodiments may be used in rendering for a light field display scheme. The light field display scheme may be used to represent three-dimensional (3D) images, and may be applicable to, for example, a 3D television (TV), a 3D monitor, a 3D digital information display (DID) or a 3D mobile device.

FIG. 1 is a diagram illustrating an operation of a 3D rendering apparatus 100 according to an exemplary embodiment. FIG. 1 illustrates a configuration of the 3D rendering apparatus 100.

The 3D rendering apparatus 100 may express rays output in different directions from points in a predetermined space without a change. The 3D rendering apparatus 100 may use a principle of generating or reflecting rays in different directions from a single point by an actual object. "Rendering" may be an operation of generating an image to be displayed on a panel 101 to generate a light field in a 3D space, or an operation of reconstructing an input image based on eye positions and a 3D optical device. For example, "rendering" may include an operation of determining a value of a pixel or a subpixel included in the panel 101 to generate a light field in a 3D space. The 3D rendering apparatus 100 may be, for example, a light field rendering apparatus.

An optical layer 103 may include an optical filter, for example, a lenticular lens, a parallax barrier, a lens array and a microlens array. Also, the optical layer 103 may include a directional backlight unit (BLU). The optical layer 103 is not limited to the above optical filter, and may include, for example, all types of optical layers that may be located in a front side or a rear side of a 3D display.

A direction of a ray output from a subpixel included in the panel 101 may be determined by the optical layer 103. A ray output from each of subpixels may be emitted in a predetermined direction while passing through the optical layer 103. Through the above process, the 3D rendering apparatus 100 may represent a stereoscopic image or a multiview image. An optical characteristic of the 3D rendering apparatus 100 may include a characteristic associated with a direction of a ray output from a subpixel in the panel 101.

The optical layer 103 may include a plurality of optical elements, for example, optical elements 104 and 105. Each of the optical elements may be referred to as a "3D pixel." A single 3D pixel may output a ray including different types of information in different directions. For example, a single 3D pixel included in the optical layer 103 may output rays 110 in "15×4" directions. The 3D rendering apparatus 100 may represent points in a 3D space using a plurality of 3D pixels.

Positions and/or sizes of subpixels in the panel 101 may vary depending on a structure of the subpixels, and accordingly a direction of a ray output from each of the subpixels may also vary depending on the structure of the subpixels.

Figure 2A:
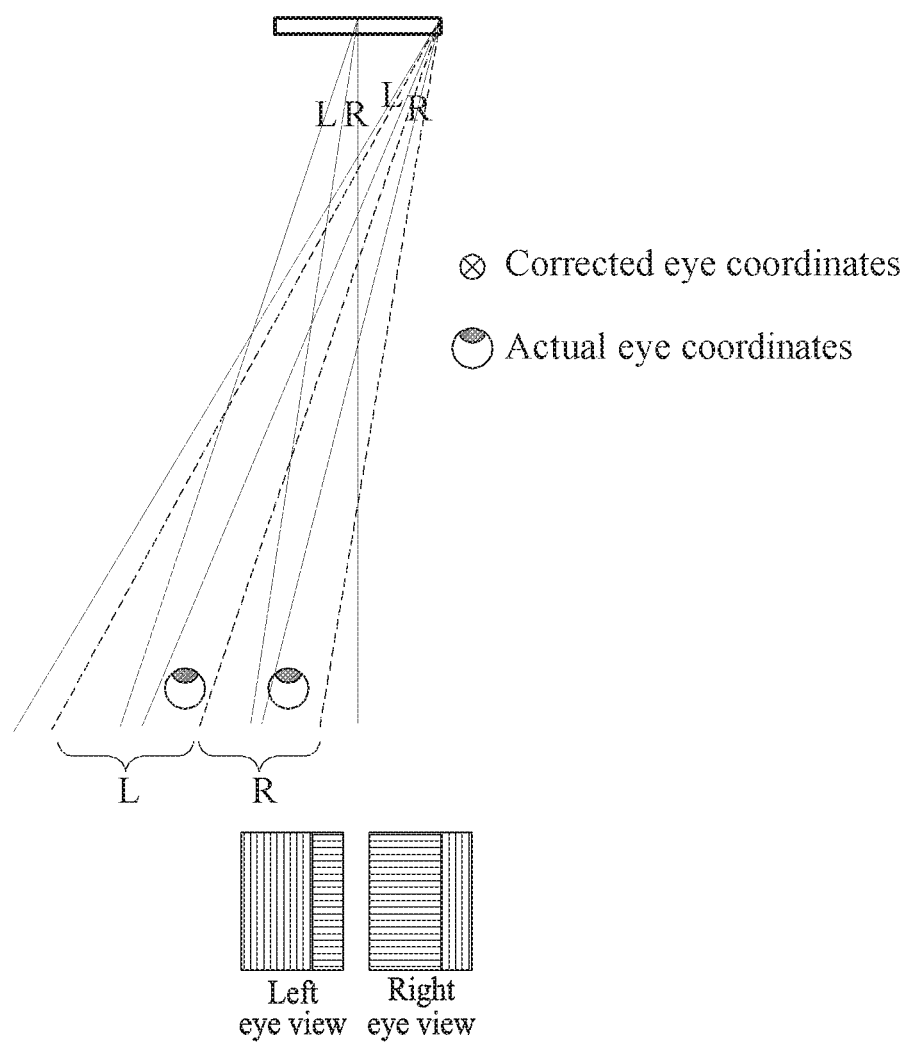
FIGS. 2A and 2B illustrate an image viewed from a side of a screen of a 3D rendering apparatus and an image with corrected eye coordinates according to an exemplary embodiment.
Figure 2B:
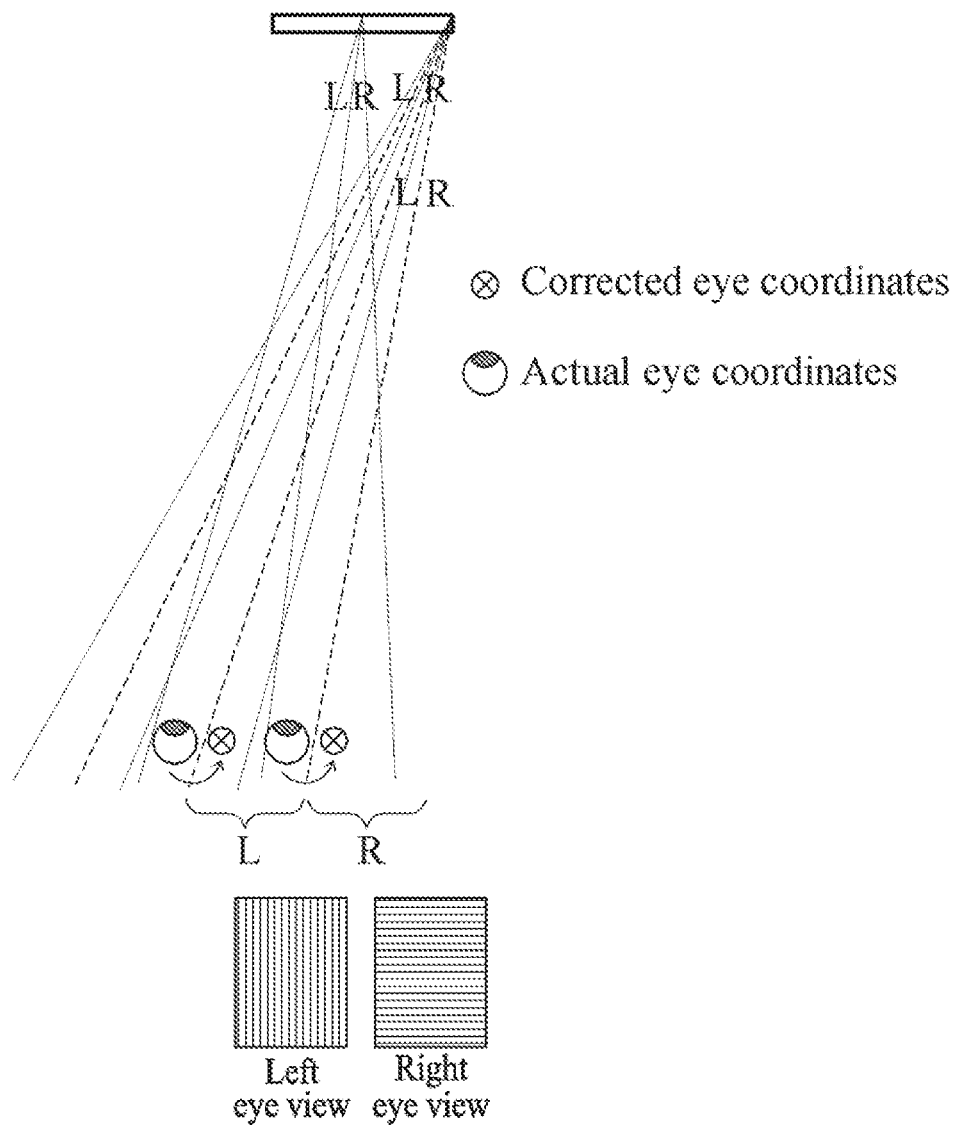

FIGS. 2A and 2B illustrate an image viewed from a side of a screen of a 3D rendering apparatus and an image with corrected eye coordinates of positions of eyes according to an exemplary embodiment. FIG. 2A illustrates an eye position and image in response to crosstalk occurring in the side of the screen of the 3D rendering apparatus. In the following description, a symbol ○ indicates an actual eye position, and a circle with an x mark "⊗" indicates an eye position corrected to a virtual eye position that reduces crosstalk by refraction of light. Also, coordinates of eye positions may be referred to as "eye coordinates." According to another exemplary embodiment, the circle with the x mark "⊗" may indicate an eye position adjusted to a virtual eye position that reduces crosstalk by refraction of light.

For example, when a user or a viewer views the screen in front of the 3D rendering apparatus, a ray of the side may be greatly refracted. In this example, rendering may be performed by applying a Snell's law based on photorefractive properties, or by applying a paraxial approximation. Paraxial approximation-based rendering may reduce a power consumption due to a small amount of calculation in comparison to Snell's law-based rendering with a large amount of calculation.

In an example of the paraxial approximation-based rendering, rays may be greatly refracted in a side of a relatively large screen greater than or equal to at least 40 inches during viewing the screen, which may cause crosstalk. In another example, even though the paraxial approximation-based rendering is applied to a relatively small screen, for example, a screen less than or equal to 10 inches of a mobile apparatus, crosstalk may not occur, because rays may be slightly refracted in a side of the screen due to the relatively small screen.

The crosstalk may indicate that an image other than a set image is shown in a set eye, as described above. For example, in a 3D display, a left image (for example, vertical stripes) needs to be shown in a left eye, however, a right image (for example, horizontal stripes) may be shown in the left eye in a predetermined position (for example, a side) of the 3D display as shown in FIG. 2A, which may indicate that crosstalk occurs. In the following description, a "left image" may be understood as an image that needs to be shown in a left eye in a normal case in which crosstalk does not occur, and a "right image" may be understood as an image that needs to be shown in a right eye in the normal case.

However, when a user views a screen of a mobile apparatus in a side of the screen instead of a central portion of the screen, for example, when the user obliquely views a screen of a tablet by holding the tablet in a hand, crosstalk may occur in the side of the screen as shown in FIG. 2A.

When a user views a small screen in a side of the small screen as shown in FIG. 2A, a ray in an opposite side may be greatly refracted, which may cause crosstalk. During viewing of a small screen, crosstalk may occur in one side of a display, which may be different from crosstalk occurring during viewing of a large screen.

In FIG. 2B, eye coordinates are corrected or adjusted to remove the crosstalk occurring in the side of the screen of the 3D rendering apparatus.

Generally, a 3D display may be designed to allow an error in detected eye coordinates in a predetermined degree, and may perform rendering. The eye coordinates may be changed within a range that allows the error in a predetermined degree. The range may be, for example, an interpupillary distance (IPD).

Referring to FIG. 2B, because a ray of a central portion of the screen has a relatively low refractive index, the left image may be shown in the left eye. However, because a ray of the side of the screen has a relatively high refractive index, the right image may be shown in the left eye. Accordingly, crosstalk may occur in a single edge of the screen.

A ray of the central portion of the screen corresponding to the left image shown in FIG. 2B may rotate slightly rightwards in comparison to FIG. 2A. However, a ray of the side of the screen corresponding to the left image shown in FIG. 2B may rotate greatly rightwards in comparison to FIG. 2A.

The crosstalk may be removed by changing actual eye coordinates detected during viewing of the side of the screen to corrected eye coordinates, and thus rays in the central portion and the side of the screen may be output based on the corrected eye coordinates.

Figure 3A:
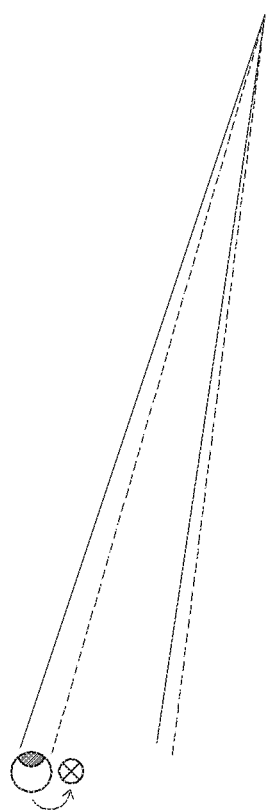
FIGS. 3A and 3B are diagrams illustrating a change in rays for an image corresponding to a left eye before and after correction of eye coordinates according to an exemplary embodiment.
Figure 3B:
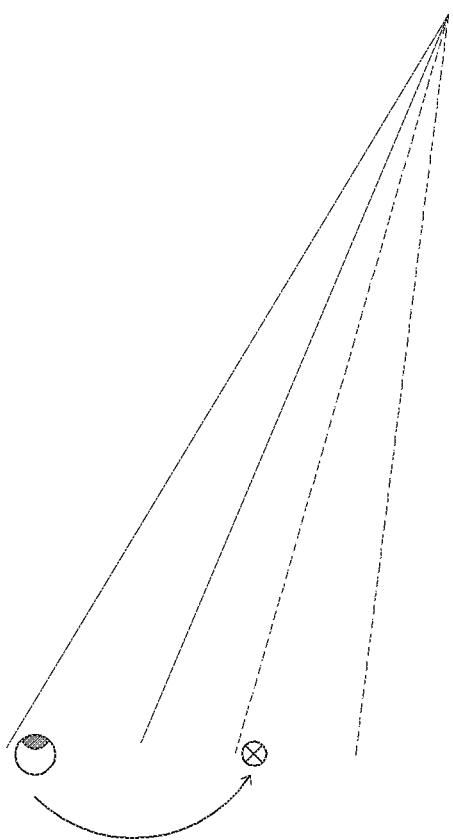

FIGS. 3A and 3B illustrate a change in rays for an image corresponding to a left eye before and after correction of eye coordinates according to an exemplary embodiment. FIG. 3A illustrates rays corresponding to a left image in a central portion of a screen, and FIG. 3B illustrates rays corresponding to a left image in a side of the screen.

In FIGS. 3A and 3B, a solid line indicates a ray that enters an eye before eye coordinates are changed, and a dashed line indicates a ray that enters an eye after eye coordinates are changed. For example, when eye coordinates are changed within a range (for example, an IPD) that allows an error in eye positions, an interval in which rays corresponding to the left image are shown in both the central portion and the side may be generated. The left eye may be located in the interval, and accordingly it is possible to prevent crosstalk from occurring in the side of the screen.

Eye coordinates may be determined by applying values (for example, coordinate values) that vary depending on eye positions based on, for example, an image sensor or a camera that tracks the eye positions.

FIG. 4 is a flowchart illustrating a 3D rendering method according to an exemplary embodiment. Referring to FIG. 4, in operation 410, a 3D rendering apparatus according to an exemplary embodiment detects eye coordinates of positions of eyes of a user from an image of the user.

The 3D rendering apparatus may reconstruct an input image to output a left image and a right image to a left eye and a right eye of a user using a 3D display, respectively. To this end, the 3D rendering apparatus may verify positions of the eyes from the 3D display based on viewpoint tracking. For example, the 3D rendering apparatus may acquire a face image of a user using a camera located in a top of the 3D display and may detect eye coordinates based on the camera.

When the 3D rendering apparatus is a mobile apparatus, the 3D rendering apparatus may acquire a face image of a user using an image sensor of the mobile apparatus, may track a viewpoint of the face image and may detect eye coordinates of positions of eyes of the user based on the image sensor. An example of a method of detecting eye coordinates of a user in a 3D rendering apparatus will be described with reference to FIG. 12.

In operation 420, the 3D rendering apparatus corrects the eye coordinates. For example, the 3D rendering apparatus may correct the eye coordinates within an IPD that allows an error in the positions of the eyes. The 3D rendering apparatus may correct or adjust the eye coordinates using, for example, a mathematical model or a heuristic method. The 3D rendering apparatus may change and correct the eye coordinates using the mathematical model or the heuristic method to prevent crosstalk from occurring.

An exemplary embodiment of a method of correcting eye coordinates using the mathematical model in the 3D rendering apparatus will be described with reference to FIGS. 5, 6, 7 and 8. An exemplary embodiment of a method of correcting eye coordinates using the heuristic method in the 3D rendering apparatus will be described with reference to FIGS. 9, 10 and 11.

For example, the 3D rendering apparatus may correct the eye coordinates based on the heuristic method that uses, for example, a predefined correction function or a predefined lookup table. The correction function may include, for example, a first correction function defined in advance to correct X coordinates among the eye coordinates, a second correction function defined in advance to correct Z coordinates among the eye coordinates, and a third correction function defined in advance to correct the X coordinates and the Z coordinates among the eye coordinates. A method of correcting the eye coordinates based on the first correction function, a method of correcting the eye coordinates based on the second correction function, and a method of correcting the eye coordinates based on the third correction function in the 3D rendering apparatus will be described with reference to FIGS. 9, 10 and 11, respectively.

The lookup table may store, in advance, corrected coordinates corresponding to the eye coordinates. The corrected coordinates corresponding to the eye coordinates may be, for example, coordinates calculated by the mathematical model.

In operation 430, the 3D rendering apparatus performs 3D rendering of the eyes based on the eye coordinates corrected in operation 420. The 3D rendering may be performed by, for example, a paraxial approximation to reduce an amount of calculation.

Figure 5:
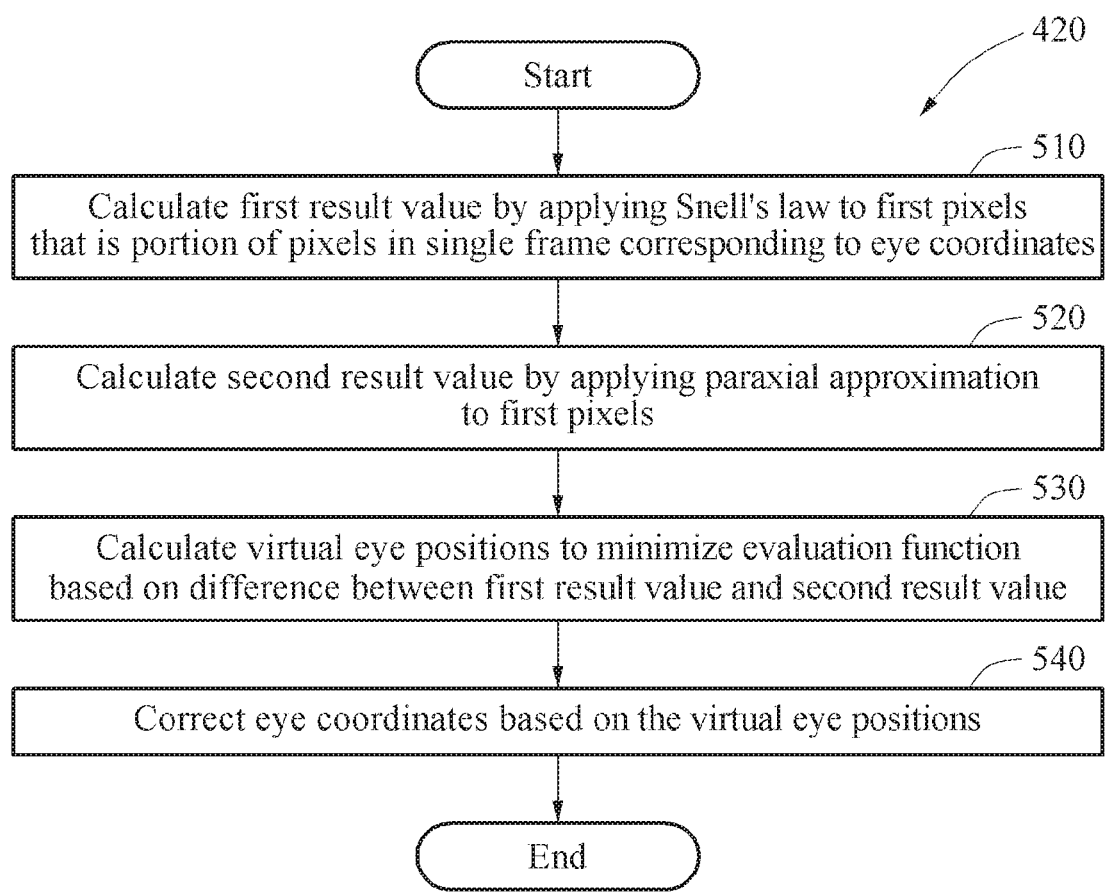
FIG. 5 is a flowchart illustrating an example of an operation of correcting eye coordinates in the 3D rendering method of FIG. 4.

FIG. 5 is a flowchart illustrating an example of operation 420 of FIG. 4. Referring to FIG. 5, in operation 510, a 3D rendering apparatus according to an exemplary embodiment calculates a first result value by applying a Snell's law formula to first pixels. The first pixels may be a portion of pixels in a single frame corresponding to eye coordinates. For example, the first pixels may include pixels located at a side of a 3D display or at an edge of the 3D display.

In operation 520, the 3D rendering apparatus calculates a second result value by applying a paraxial approximation to the first pixels. The paraxial approximation may be understood as an approximation of a sine value used in the Snell's law formula to a linear expression based on a Taylor's rule. When the paraxial approximation is applied, an approximate value may be a ray that lies close to an optical axis and that is incident in parallel to the optical axis. A method of calculating the first result value and the second result value in the 3D rendering apparatus will be further described with reference to FIG. 7 according to an exemplary embodiment.

The 3D rendering apparatus may correct or adjust the eye coordinates based on an evaluation function that is based on a difference between the first result value and the second result value.

In operation 530, the 3D rendering apparatus calculates virtual eye positions to minimize the evaluation function that is based on the difference between the first result value and the second result value.

In operation 540, the 3D rendering apparatus corrects or adjusts the eye coordinates based on the virtual eye positions calculated in operation 530. A method of correcting the eye coordinates based on the evaluation function in the 3D rendering apparatus will be further described with reference to FIG. 8 according to an exemplary embodiment.

According to an exemplary embodiment, the first result value is calculated by applying the Snell's law to only a portion of pixels in a single frame, and not all pixels in the frame. In other words, according to an exemplary embodiment, because the first pixels may correspond to the portion of pixels, and not all the pixels in the single frame, utilization of computer resources is improved. According to an exemplary embodiment, The first result value is used to correct the eye coordinates using an evaluation function that is based on a difference between the first result value and the second result value, and is not directly or separately used.

Figure 6:
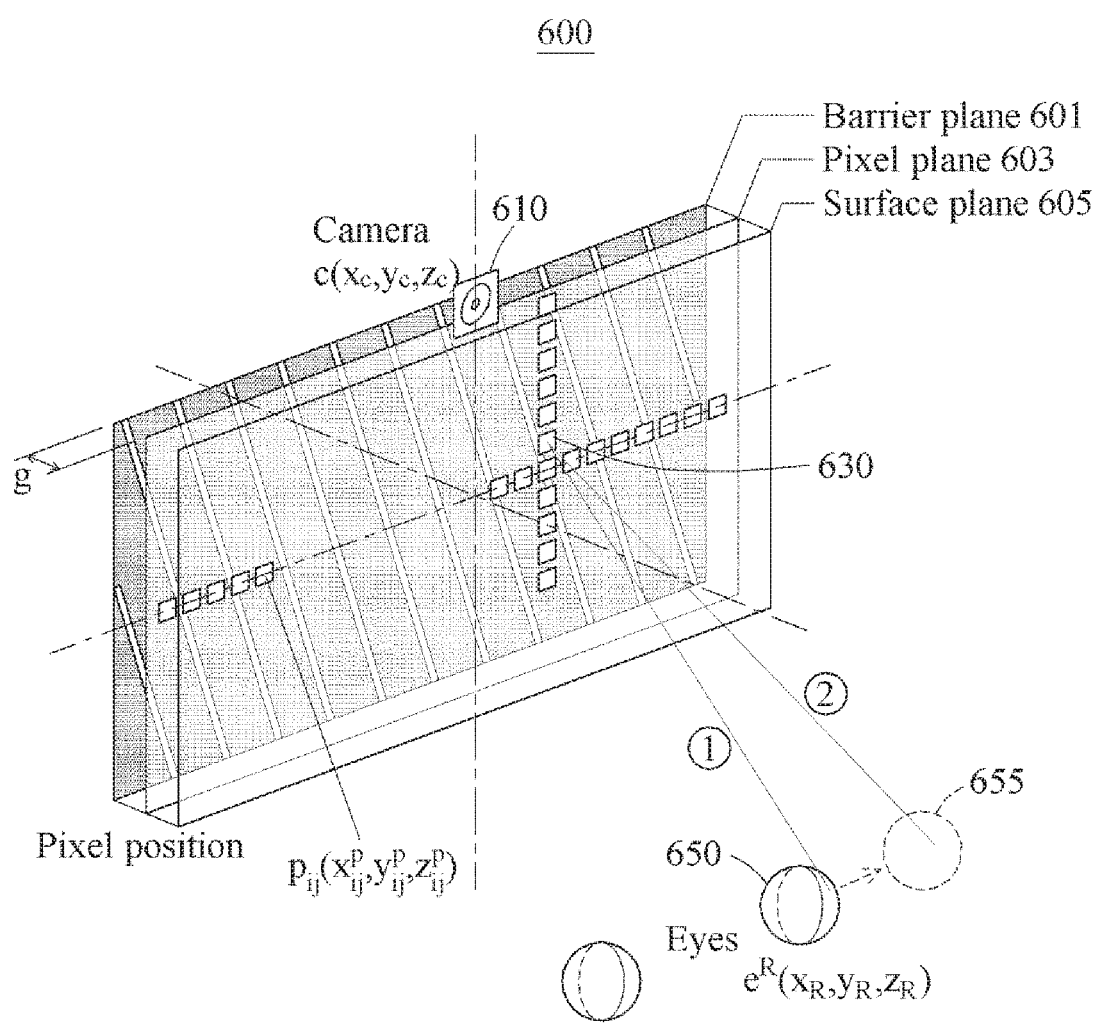
FIG. 6 is a diagram illustrating a structure of a 3D display of a 3D rendering apparatus according to an exemplary embodiment.

FIG. 6 is a diagram illustrating a structure of a 3D display 600 of a 3D rendering apparatus according to an exemplary embodiment. Referring to FIG. 6, rays ① and ② may pass through a pixel 630 of the 3D display 600. The 3D display 600 may be, for example, a glasses-free 3D display.

The 3D display 600 may include a barrier plane 601, a pixel plane 603 and a surface plane 605.

The barrier plane 601 may correspond to an optical layer through which rays output from pixels pass, as described above. The barrier plane 601 may include, for example, an optical filter, for example, a lenticular lens, a parallax barrier, a lens array and a microlens array. Also, the barrier plane 601 may include a directional BLU. For example, the barrier plane 601 may include all types of optical layers that may be located in a front side or a rear side of the 3D display 600, in addition to the above-described optical filter.

The pixel plane 603 may correspond to a panel including pixels. Directions of rays output from pixels included in the pixel plane 603 may be determined by the barrier plane 601. A ray output from each of the pixels may be emitted in a predetermined direction and may represent a stereoscopic image or a multiview image. An optical characteristic of a 3D rendering apparatus may have a characteristic associated with a direction of a ray of a pixel.

The 3D rendering apparatus may determine content corresponding to a viewpoint region, to which a direction of a ray (for example, the ray ①) passing through the pixel 630 corresponding to a direction of a ray output from one of the pixels in the barrier plane 601 belongs, to correspond to one of eyes of users. For example, a position of an eye of a user (for example, a right eye) may be represented as $e^R(x_R, y_R, z_R)$.

The 3D display 600 may include a camera (or an image sensor) 610. The camera 610 may be located in a top or a side of the 3D display 600. A position of the camera 610 may be represented as $c(x_c, y_c, z_c)$. Positions of the pixels included in the pixel plane 603 may be represented as $p_{ij}(x_{ij}^P, y_{ij}^P, z_{ij}^P)$.

The ray ① generated by the 3D display 600 may correspond to an actual eye position $e^R(x_R, y_R, z_R)$ based on the Snell's law and the ray ② may be a ray corrected by the paraxial approximation. An error between the rays ① and ② may occur. Due to the error, crosstalk may occur to degrade an image quality of the 3D display 600. The ray ① may be an actual ray based on the Snell's law.

A method of calculating the error between the rays ① and ② will be described with reference to FIG. 7.

Figure 7:
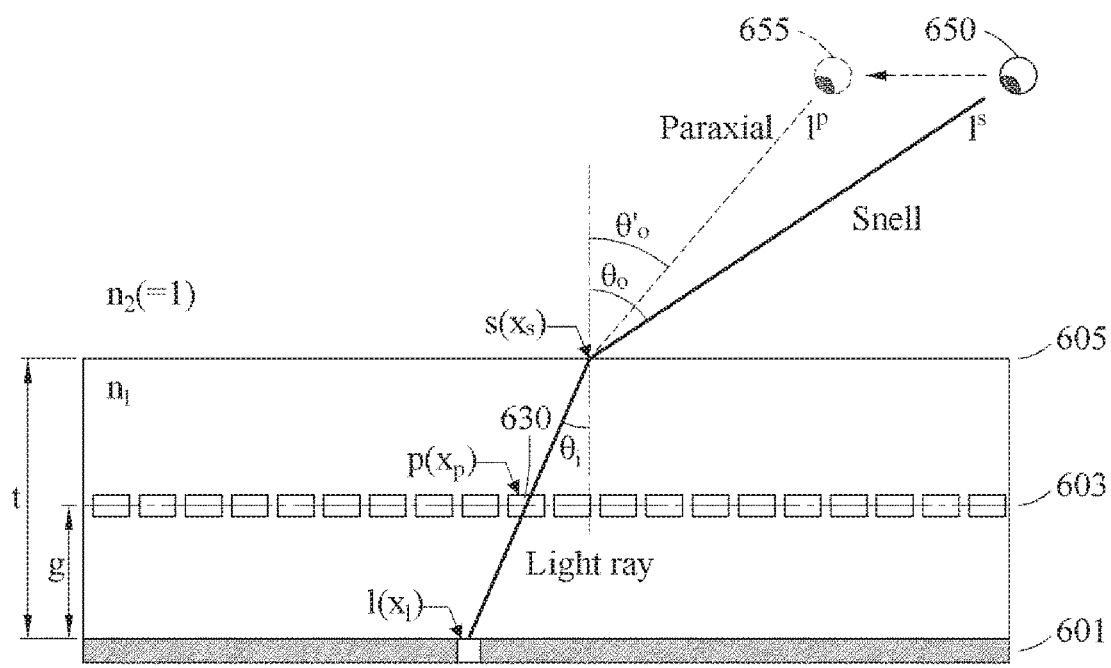
FIGS. 7 and 8 are diagrams illustrating a method of correcting eye coordinates of a user using a mathematical model according to an exemplary embodiment.
Figure 8:
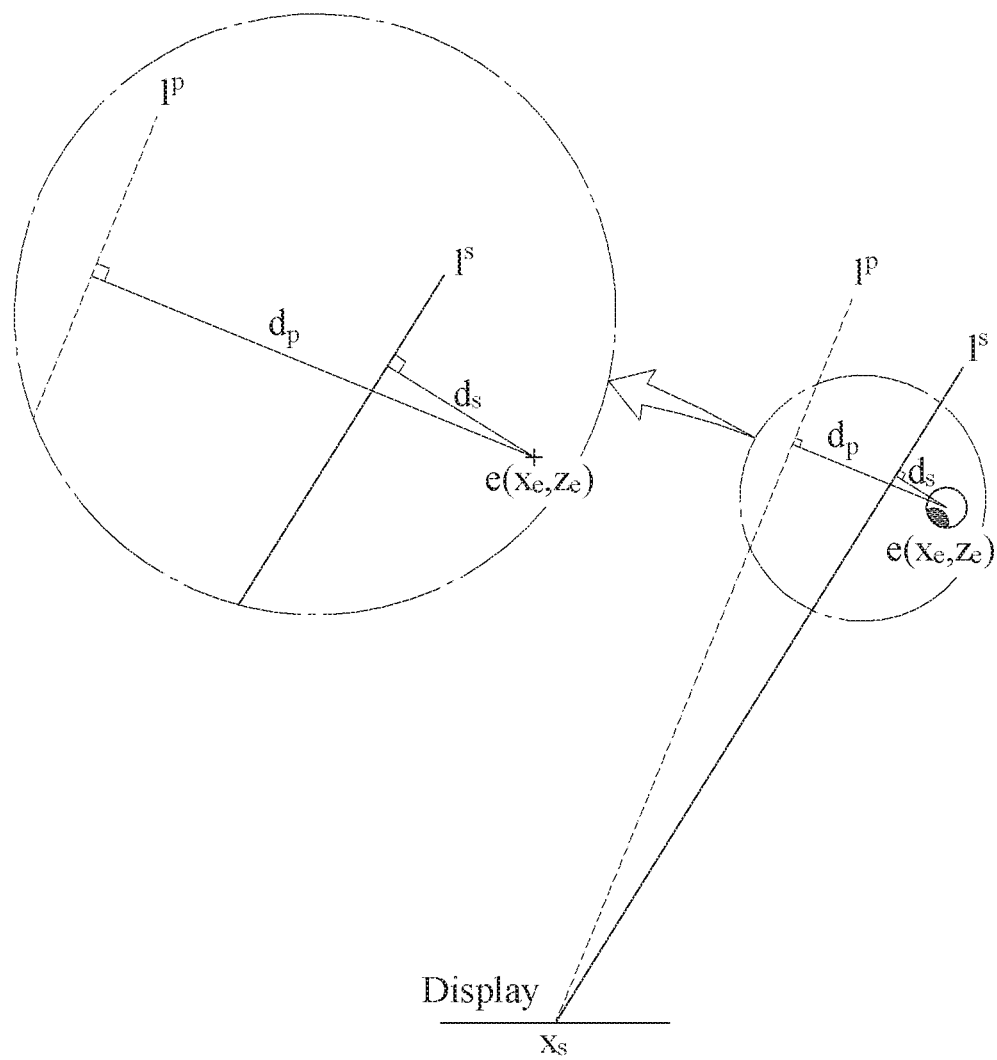

FIGS. 7 and 8 illustrate a method of correcting eye coordinates using a mathematical model according to an exemplary embodiment.

Referring to FIG. 7, a 3D rendering apparatus may calculate a first result value by applying the Snell's law formula to first pixels and calculate a second result value by applying a paraxial approximation to the first pixels.

Based on the Snell's law, a direction in which a ray of light is to be refracted when the ray passes through a boundary between two transparent materials with different optical properties may be determined.

For example, a ray output at a position $x_l$ of the barrier plane 1 601 may be assumed to be output through a position $x_p$ of the pixel plane p 603 and a position $x_s$ of the surface plane s 605. Also, when a ray incident at an angle $\theta_i$ of incidence passes through a medium $n_2$, for example, air, through a medium $n_1$, an angle of refraction of a ray based on the Snell's law may be assumed as $\theta_o$, and an angle of refraction of a ray based on the paraxial approximation may be assumed as $\theta_o^l$.

A distance between the barrier plane 601 and the pixel plane 603 may be denoted by g, and a distance between the barrier plane 601 and the surface plane 605 may be denoted by t. Also, an eye position corresponding to a result value obtained by applying the Snell's law formula to a ray output from the pixel 630 may be denoted by $l^s$ 650, and an eye position corresponding to a result value obtained by applying the paraxial approximation may be denoted by $l^p$ 655.

The angle $\theta_i$ of incidence may be represented as shown in Equation 1 below.

$$\theta_i = \tan^{-1}\left(\frac{x_p - x_l}{g}\right) \quad \text{[Equation 1]}$$

Also, the angle $\theta_o$ of refraction may be obtained using Equation 2 shown below. Also, the angle $\theta_o^l$ of refraction may be obtained using Equation 3 shown below.

$$\theta_o = \sin^{-1}\left(\frac{n_1}{n_2}\sin\theta_i\right) = \sin^{-1}\left(\frac{n_1}{n_2}\sin\left(\tan^{-1}\left(\frac{x_p - x_l}{g}\right)\right)\right) \quad \text{[Equation 2]}$$

$$\theta_o' = \frac{n_1}{n_2}\theta_i = \frac{n_1}{n_2}\frac{x_p - x_l}{g} \quad \text{[Equation 3]}$$

The 3D rendering apparatus may increase a speed of calculation by the paraxial approximation for most of pixels included in a single frame, instead of performing calculation by applying the Snell's law formula to all pixels, and may correct an error caused by the paraxial approximation based on a result obtained by calculation of the Snell's law formula for a portion of the pixels in the single frame.

Referring to FIG. 8, the 3D rendering apparatus may correct or adjust the eye coordinates based on the eye positions $l^s$ and $l^p$.

For example, when the Snell's law formula is applied to a ray passing through the position $x_s$ of the surface plane s 605 that is a surface of a 3D display, the eye position may be assumed as $l^s$. When the paraxial approximation is applied, the eye position may be assumed as $l^p$. Also, an actual eye position may be assumed as $e(x_e, z_e)$.

In this example, when a distance from the actual eye position $e(x_e, z_e)$ to the eye position $l^s$ is denoted by $d_s$ and when a distance from the actual eye position $e(x_e, z_e)$ to the eye position $l^p$ is denoted by $d_p$, a difference Diff between the distances for each pixel may be obtained as shown in Equation 4 below.

$$\text{diff}=|d_s-d_p| \quad \text{[Equation 4]}$$

The 3D rendering apparatus may correct the eye coordinates based on an evaluation function that is based on the difference Diff obtained using Equation 4.

The evaluation function may be represented as shown in Equation 5 below.

$$e^*(x_e^*, z_e^*) = \min_{x_e, z_e} \sum_{\forall pixels} |d_s - d_p|$$ [Equation 5]

The 3D rendering apparatus may calculate virtual eye positions to minimize the evaluation function of Equation 5 for all pixels of a single frame, and may correct the eye coordinates based on the virtual eye positions.

When the evaluation function of Equation 5 is applied to a portion of pixels located in a side of a single frame, the evaluation function may be represented as shown in Equation 6 below.

$$e^*(x_e^*, z_e^*) = \min_{x_e, z_e} \sum_{side\ pixels} |d_s - d_p|$$ [Equation 6]

In the related art, Snell's Law calculations are required for all pixels, the same number of operations as the total number of pixels is required. In comparison, in the present disclosure, since operations are performed by paraxial approximation and the eye coordinates are corrected, an amount of calculation may be significantly reduced. Further, according an exemplary embodiment, while performing evaluation of a portion of pixels through the Snell's Law to correct the eye coordinates, information indicating that eye coordinates A have been corrected to B by performing the evaluation only once is extracted (i.e., for calibration), and if eye coordinates A are input after extraction, the eye coordinates A may be merely corrected directly to B. In other words, according to an exemplary embodiment, there may be no need to perform the Snell's Law operations every time.

According to an exemplary embodiment of the present disclosure, the speed of calculations may be increased by paraxial approximation for most of pixels in a single frame, instead of performing calculation by applying the Snell's law to all pixels. Also, according to an exemplary embodiment of the present disclosure, power consumption may be reduced by reducing an amount of calculation due to a complex trigonometric function used in the Snell's law by correcting an error caused by paraxial approximation based on a calculation result of the Snell's law for a portion of the pixels in the single frame. Thus, there is an advantage of preventing occurrence of crosstalk in real time in an apparatus with low performance.

Figure 9:
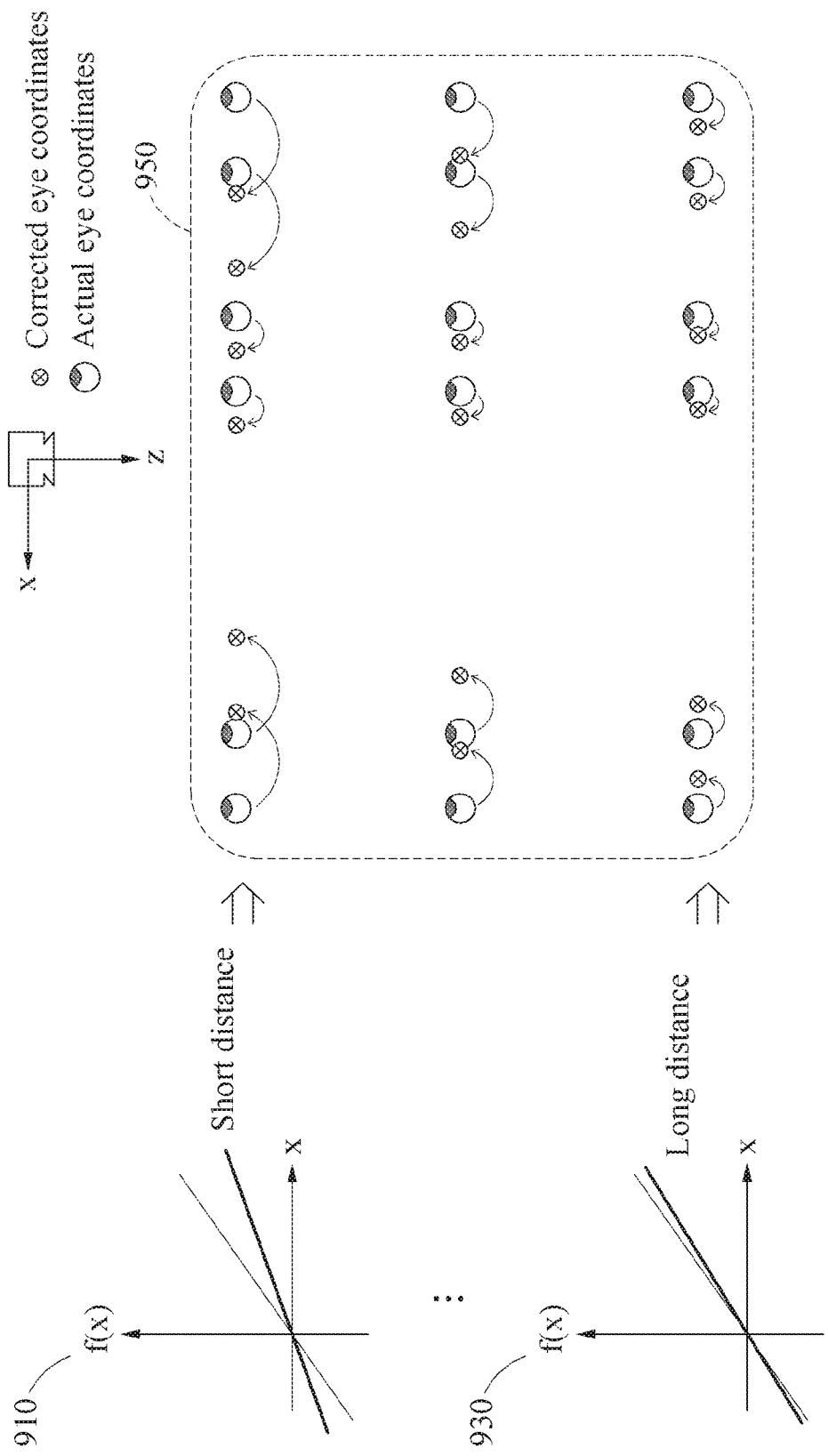
FIGS. 9, 10 and 11 are diagrams illustrating a method of correcting eye coordinates of a user using a heuristic method according to an exemplary embodiment.
Figure 10:
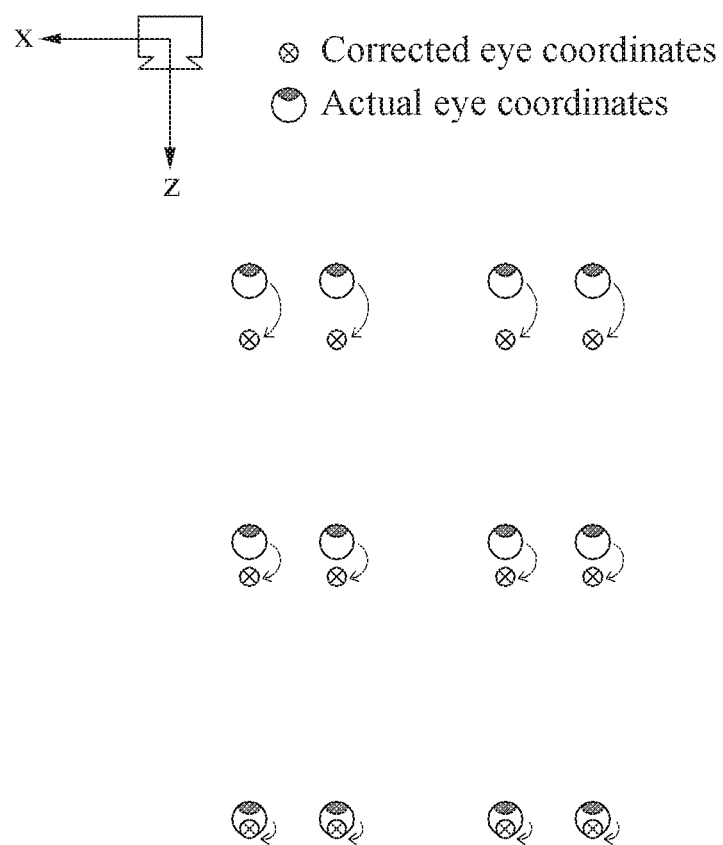
Figure 11:
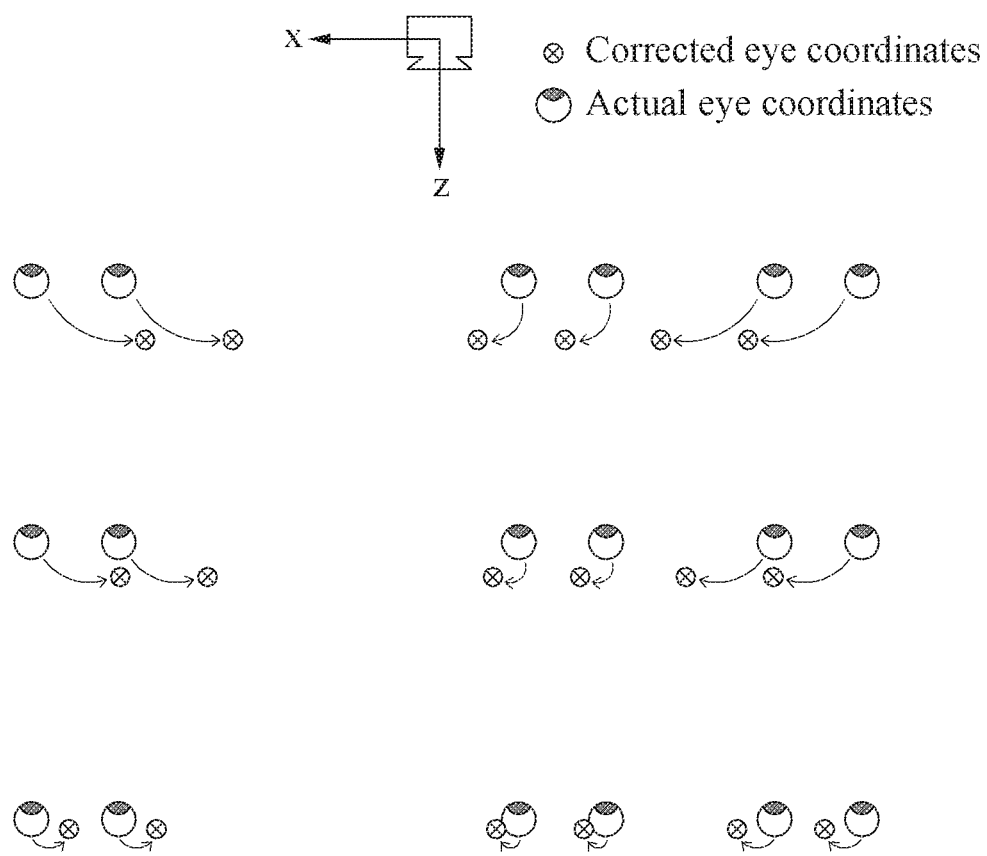

FIGS. 9, 10 and 11 illustrate a method of correcting eye coordinates using a heuristic method according to an exemplary embodiment. A 3D rendering apparatus according to an example embodiment may correct the eye coordinates using the heuristic method based on at least one of a first correction function, a second correction function or a lookup table. The first correction function and the second correction function may be defined in advance. The lookup table may store, in advance, corrected coordinates corresponding to the eye coordinates.

FIG. 9 illustrates a result obtained by correcting X coordinates among the eye coordinates using the first correction function $f(x)=ax+b$.

Prior to description of each of parameters of the first correction function, a camera (or an image sensor) may be applied as an origin of an eye coordinate system, and an eye position may be represented by an X coordinate in a horizontal direction, a Y coordinate in a vertical direction and a Z coordinate in a direction of a front of the camera.

In the first correction function $f(x)=ax+b$, x denotes an X coordinate among the eye coordinates that are not corrected, and $\beta(x)$ denotes an X' coordinate among the corrected eye coordinates.

A first parameter a may have a value less than or equal to "1," and may be affected by Z coordinates among the eye coordinates. The first parameter a may change based on the Z coordinates. In an example, the first parameter a may decrease when a distance between the eyes and a screen (or a camera) decreases, and may increase when the distance the eyes and the screen increases. When the distance the eyes and the screen increases, the first parameter a may have a value close to "1." A second parameter b may be a distance between a central portion of a screen of a 3D display and a camera (or an image sensor).

In FIG. 9, a graph 910 shows a result obtained by applying the first correction function to a short distance, and a graph 930 shows a result obtained by applying the first correction function to a long distance.

It may be found from the graph 910 that a value of the first parameter decreases when the distance the eyes and the screen decreases. Also, it may be found from the graph 930 that the value of the first parameter increases to be close to "1" when the distance the eyes and the screen increases.

A dashed line box 950 may indicate a change from actual eye coordinates to eye coordinates corrected based on the first correction function.

FIG. 10 illustrates a result 1000 obtained by correcting Z coordinates among the eye coordinates using a second correction function $f(z)=cz+d$.

In the second correction function $f(z)=cz+d$, z denotes a Z coordinate among the eye coordinates that are not corrected, and $f(z)$ denotes a Z' coordinate among the corrected eye coordinates.

A third parameter c may change based on the X coordinates among the eye coordinates. The third parameter c may have a value less than "1," and may be affected by the X coordinates. For example, the third parameter c may decrease when eyes move towards a side of a screen, and may increase when the eyes move towards a central portion of the screen. Also, the third parameter c may have a value close to "1" when the eyes move towards the central portion of the screen.

A fourth parameter d may also be affected by the X coordinates. The fourth parameter d may have a value greater than "0." For example, the fourth parameter d may increase when eyes move towards a side of a screen, and may decrease the eyes move towards a central portion of the screen. Also, the fourth parameter d may have a value close to "0" when the eyes move towards the central portion of the screen.

FIG. 11 illustrates a result 1100 obtained by correcting both X coordinates and Z coordinates among the eye coordinates using both the first correction function $f(x)=ax+b$ and the second correction function $f(z)=cz+d$.

Figure 12:
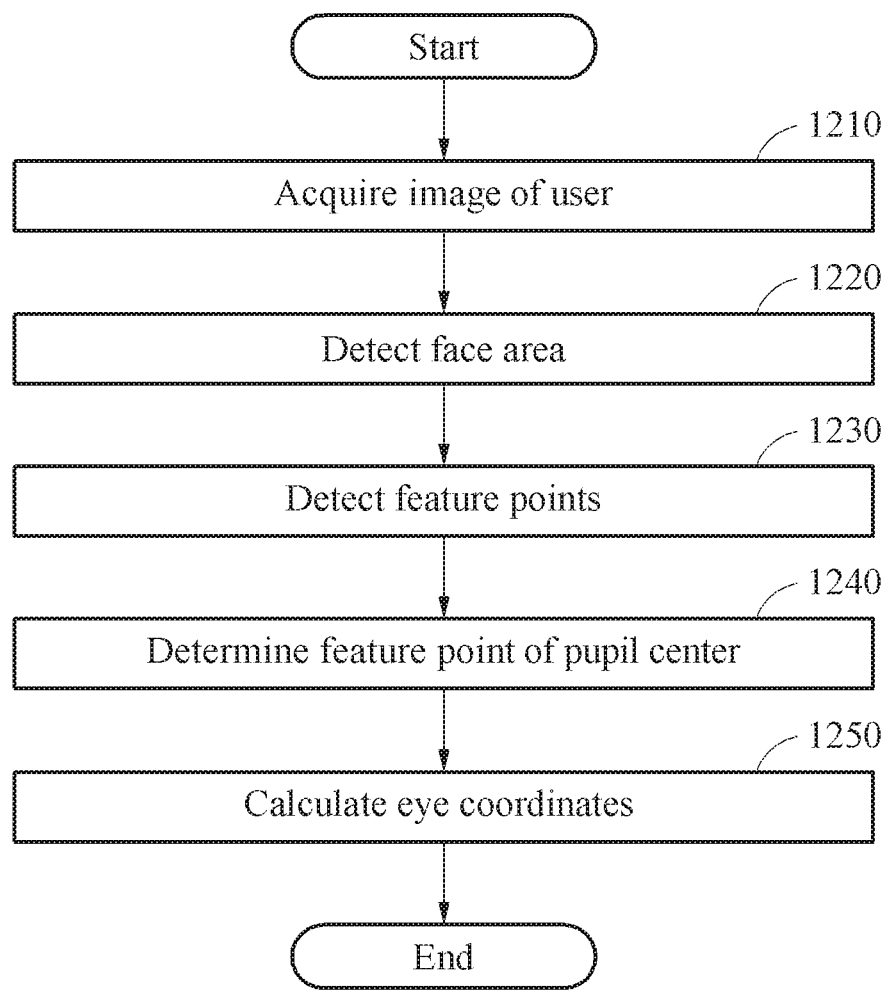
FIG. 12 is a flowchart illustrating a method of calculating eye coordinates of a user according to an exemplary embodiment.

FIG. 12 is a flowchart illustrating a method of calculating eye coordinates of a user according to an example embodiment. The method of FIG. 12 may be performed by a 3D rendering apparatus or a separate eye tracker that includes at least one processor and a camera or an image sensor.

Referring to FIG. 12, in operation 1210, the 3D rendering apparatus acquires an image of the user using a camera or an image sensor.

In operation 1220, the 3D rendering apparatus detects a face area from the image acquired in operation 1210. The image may be, for example, a 2D image. For example, the 3D rendering apparatus may determine whether a face area is included in the image based on data acquired by training a face image, and may detect the face area.

In operation 1230, the 3D rendering apparatus detects feature points from the face area detected in operation 1220. The 3D rendering apparatus may detect feature points corresponding to a boundary portion of an eye, a nose or a lip in a face. For example, the 3D rendering apparatus may detect the feature points from the face area based on data acquired in advance through training of feature points of the face area.

In operation 1240, the 3D rendering apparatus determines (or detects) a feature point of a pupil center based on the feature points detected in operation 1230. For example, when pre-trained data includes a feature point defined for a pupil center, the 3D rendering apparatus may determine at least one feature point corresponding to a pupil among the feature points detected in operation 1230. When the pre-trained data is absent, the 3D rendering apparatus may determine the feature point of the pupil center based on an average value of feature points around an eye.

In operation 1250, the 3D rendering apparatus calculates the eye coordinates based on the feature point determined in operation 1240. The 3D rendering apparatus may calculate 3D eye coordinates (X, Y, Z) based on a position of the camera. The feature point determined in operation 1240 may be represented by 2D coordinates in an image. For example, the 3D rendering apparatus may convert 2D coordinates into 3D coordinates based on an IPD and a face direction of the user based on the camera in the image. The face direction may be calculated by image processing, and the IPD may be set to 65 millimeters (mm) that is an average IPD of people.

According to an exemplary embodiment, an eye coordinate correction equation or a lookup table acquired by a heuristic method may be considered to be obtained by approximating a result of correction of eye coordinates after an evaluation using the Snell's law. According to an exemplary embodiment, by changing input eye coordinates, eye coordinates at which an evaluation function described in the exemplary embodiment of the present disclosure is minimized may be determined or found. According to an exemplary embodiment, the input eye coordinates may be set sequentially from left to right, from top to bottom and from front to back, and new eye coordinates at which the evaluation function is minimized based on each of the input eye coordinates are calculated and stored. According to an exemplary embodiment, the calculated new eye coordinates may be stored in a lookup table. According to an exemplary embodiment, in order to prevent an excessive increase in memory usage, only several specific eye positions may be evaluated and interpolation may be performed on the rest. According to an exemplary embodiment, a result of a lookup table may expressed by a linear equation, and the result may be similar to a linear equation mentioned in the heuristic method described above.

As described in the present disclosure, eye coordinates may be corrected or adjusted using a heuristic method based on a lookup table that stores, in advance, corrected coordinates corresponding to the eye coordinates. According to an exemplary embodiment, it is not necessary to have the corrected eye coordinates fixedly stored in the lookup table and it may be possible to dynamically change the eye corrected coordinates stored in the look up table before a process of correcting the eye coordinates is performed. According to an exemplary embodiment, by using the lookup table, corrected coordinates may be found from the lookup table without complex calculations, thus reducing power consumption required for the complex calculations.

Figure 13:
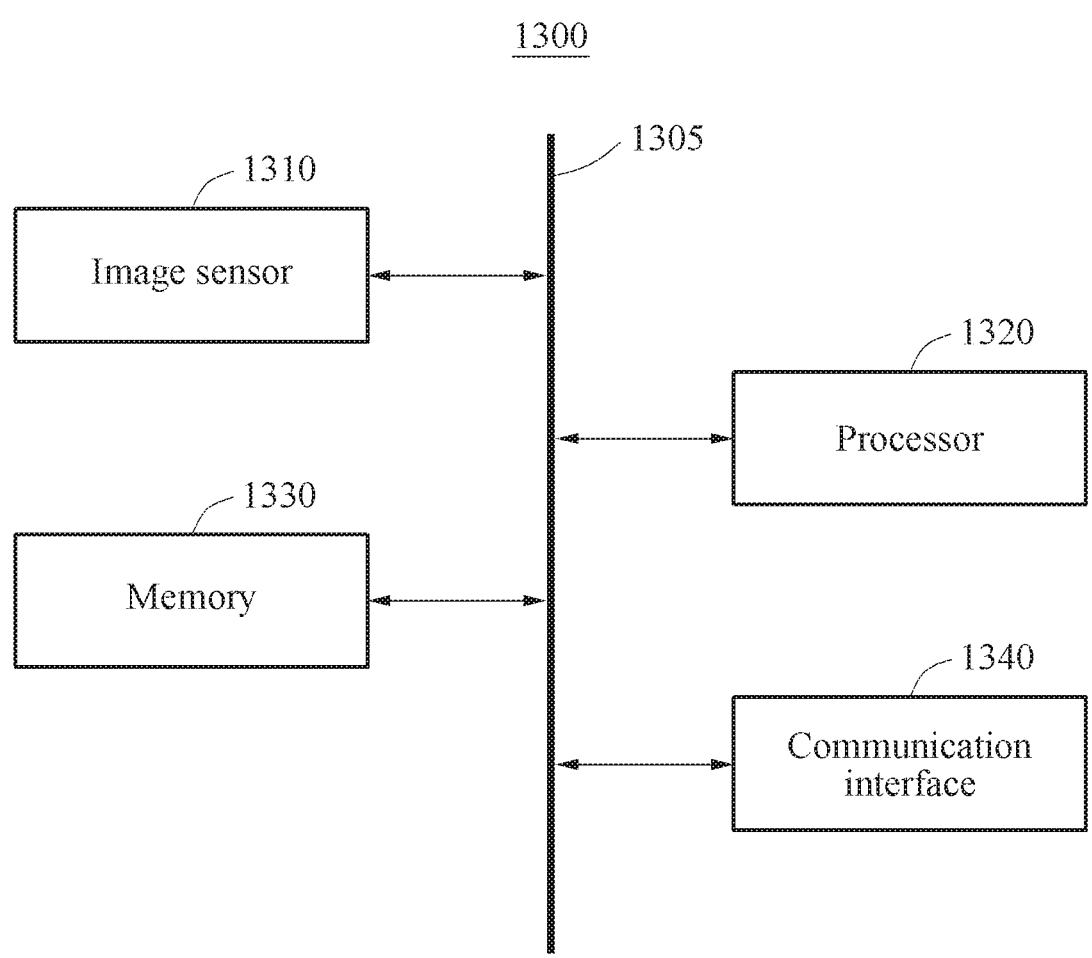
FIG. 13 is a block diagram illustrating a 3D rendering apparatus according to an exemplary embodiment.

FIG. 13 is a block diagram illustrating a 3D rendering apparatus 1300 according to an exemplary embodiment. Referring to FIG. 13, the 3D rendering apparatus 1300 includes an image sensor 1310, a processor 1320 and a memory 1330. The image sensor 1310, the processor 1320 and the memory 1330 may communicate with each other via a bus 1305.

The image sensor 1310 may detect eye coordinates of positions of eyes of a user from an image of the user. The image sensor 1310 may acquire a face image of the user. The processor 1320 may track a viewpoint of the face image and may detect the eye coordinates based on the image sensor 1310.

The processor 1320 may correct the eye coordinates and may perform 3D rendering of the eyes based on the corrected eye coordinates. The processor 1320 may change the eye coordinates within an IPD that allows an error in the positions of the eyes. The processor 1320 may apply the Snell's law formula to first pixels that are a portion of pixels in a single frame corresponding to the detected eye coordinates, and may correct the eye coordinates based on a result of the applying. The first pixels may include pixels located in a side of a 3D display.

The processor 1320 may calculate a first result value by applying the Snell's law formula to the first pixels, may calculate a second result value by applying a paraxial approximation to the first pixels, and may correct the eye coordinates based on an evaluation function that is based on a difference between the first result value and the second result value. Also, the processor 1320 may calculate virtual eye positions to minimize the evaluation function, and may correct the eye coordinates based on the virtual eye positions.

In addition, the processor 1320 may perform an algorithm corresponding to at least one of the methods described above with reference to FIGS. 4 through 12. The processor 1320 may execute a program and may control the 3D rendering apparatus 1300. A program code executed by the processor 1320 may be stored in the memory 1330. The 3D rendering apparatus 1300 may be connected to an external device (for example, a personal computer (PC) or a network) via an input/output device (not shown), and may exchange data with the external device. The 3D rendering apparatus 1300 may include various electronic systems, for example, a TV, a smart TV or a smartphone.

The memory 1330 may store a 3D rendering result for the eyes and the corrected eye coordinates. The memory 1330 may include, for example, a volatile memory or a nonvolatile memory.

The 3D rendering apparatus 1300 further includes a communication interface 1340. The communication interface 1340 may transmit the 3D rendering result. The 3D rendering result may be transmitted to, for example, a 3D display. For example, the 3D rendering apparatus 1300 may further include a 3D display, although not shown in the drawings. In this example, the 3D rendering result may be displayed directly on the 3D display instead of using the communication interface 1340.

Figure 14B:
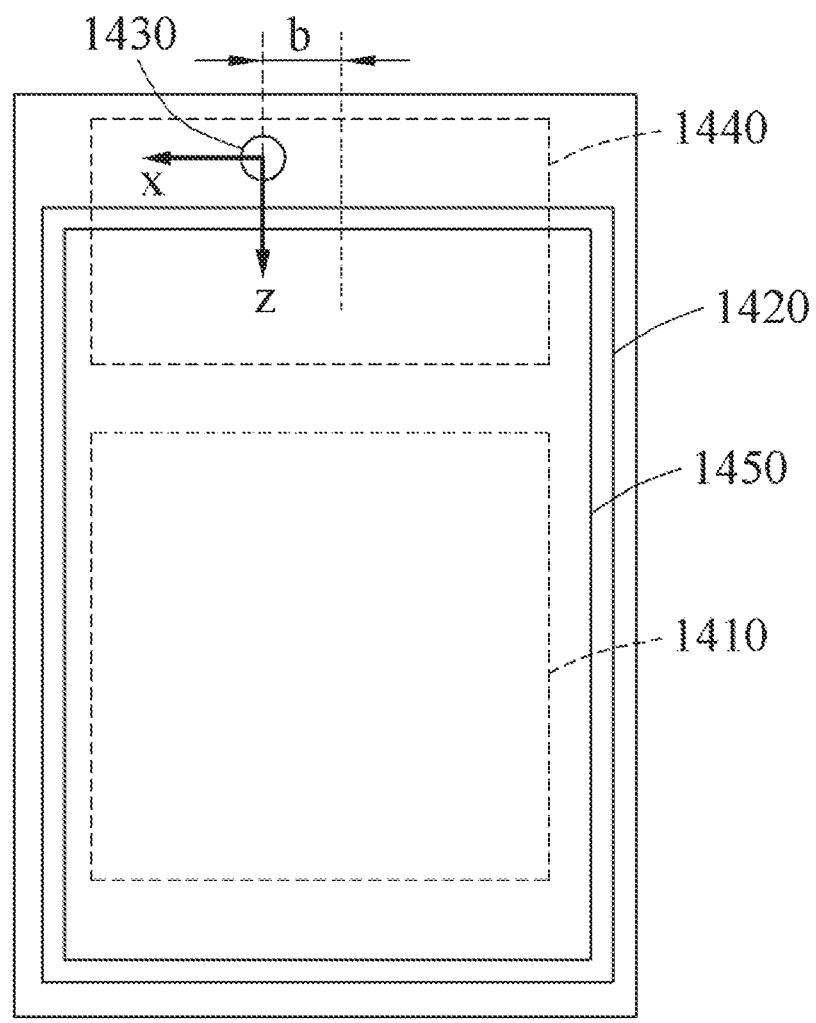

FIGS. 14A and 14B illustrate a mobile apparatus 1400 as a 3D rendering apparatus according to an exemplary embodiment. The above-described 3D rendering method may be applicable to a mobile apparatus, for example, a tablet or a smartphone, with a low power consumption due to a small amount of calculation during rendering.

The mobile apparatus 1400 includes a power supply device 1410, an optical device 1420, an imaging device 1430, an operating device 1440 and a panel 1450. FIGS.

14A and 14B illustrate a top side and a front side of the mobile apparatus 1400, respectively.

The power supply device 1410 may be a device configured to supply power to the mobile apparatus 1400. The power supply device 1410 may include various batteries.

The optical device 1420 may be a device configured to separate rays in a predetermined direction. The optical device 1420 may include, for example, a parallax barrier or a lenticular lens. For example, when the optical device 1420 includes a lenticular lens, the lenticular lens may be located in front of the panel 1450.

The imaging device 1430 may detect eye coordinates. The imaging device 1430 may include an image sensor, for example, a complementary metal-oxide semiconductor (CMOS) image sensor (CIS) or a charge-coupled device (CCD). In FIGS. 14A and 14B, b denotes a difference between a central portion of the imaging device 1430, for example, a camera, and a central portion of a screen at which eyes of a user are located.

The operating device 1440 may perform a 3D rendering method according to an example embodiment. The operating device 1440 may change eye coordinates acquired from a camera by applying the above-described first correction function, the above-described second correction function or a combination of the first correction function and the second correction function, and may perform rendering based on a paraxial approximation. For example, the operating device 1440 may perform viewpoint tracking-based 3D rendering by software. The operating device 1440 may include a processor, for example, an application processor. The processor may operate an operating system (OS) included in the operating device 1440 and may perform all operations.

The panel 1450 may be a device configured to represent an RGB image, for example, a liquid crystal display (LCD).

The exemplary embodiments described herein may be implemented using hardware components, software components, or a combination thereof. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described example embodiments may be recorded in non-transitory computer-readable media including program instructions to implement various operations which may be performed by a computer. The media may also include, alone or in combination with the program instructions, data files, data structures, and the like. The program instructions recorded on the media may be those specially designed and constructed for the purposes of the example embodiments, or they may be of the well-known kind and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer using an interpreter. The described hardware devices may be configured to act as one or more software modules in order to perform the operations of the above-described example embodiments, or vice versa.

While this disclosure includes exemplary embodiments, it will be apparent to one of ordinary skill in the art that various changes in form and details may be made in these example embodiments without departing from the spirit and scope of the claims and their equivalents. The example embodiments described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A three-dimensional (3D) image rendering method comprising:
    detecting eye coordinates of positions of eyes of a user from an image of the user;
    calculating a first result value by applying a Snell's law formula to first pixels that are a portion of pixels in a single frame corresponding to the eye coordinates;
    calculating a second result value by applying a paraxial approximation to the first pixels;
    adjusting the eye coordinates to correspond to virtual eye positions based on a difference between the first result value and the second result value that reduce crosstalk caused by refraction of light; and
    performing 3D image rendering of the eyes based on the adjusted eye coordinates.

2. The 3D image rendering method of claim 1, wherein the adjusting of the eye coordinates comprises adjusting the eye coordinates within an interpupillary distance (IPD).

3. The 3D image rendering method of claim 1, wherein the adjusting of the eye coordinates comprises:

determining an evaluation function value based on a difference between the first result value and the second result value;

calculating the virtual eye positions to minimize the evaluation function value; and adjusting the eye coordinates based on the virtual eye positions.

4. The 3D image rendering method of claim 1, wherein the first pixels comprise pixels located at an edge portion of a 3D display.

5. The 3D image rendering method of claim 1, wherein the adjusting of the eye coordinates comprises adjusting the eye coordinates based on at least one of a first function defined in advance to adjust X coordinates among the eye coordinates, a second function defined in advance to adjust Z coordinates among the eye coordinates, and a lookup table that stores adjust eye coordinates corresponding to the eye coordinates in advance.

6. The 3D image rendering method of claim 5, wherein the first function is configured to adjust the X coordinates based on a first parameter that changes based on the Z coordinates and a second parameter that is based on a distance between an image sensor and a central portion of a screen of a 3D display.

7. The 3D image rendering method of claim 6, wherein the first parameter has a value less than or equal to 1, and
wherein when a distance between the eyes and the screen of the 3D display decreases, the first parameter decreases, and when the distance between the eyes and the screen increases, the first parameter increases.

8. The 3D image rendering method of claim 5, wherein the second function is configured to adjust the Z coordinates based on a third parameter and a fourth parameter that change based on the X coordinates.

9. The 3D image rendering method of claim 8, wherein
when the eyes move towards an edge portion of a screen of a 3D display, the third parameter decreases,
when the eyes move towards a central portion of the screen, the third parameter increases, and
when the eyes move towards the central portion of the screen, the third parameter has a value close to 1.

10. The 3D image rendering method of claim 8, wherein
when the eyes move towards an edge portion of a screen of a 3D display, the fourth parameter increases,
when the eyes move towards a central portion of the screen, the fourth parameter decreases, and
when the eyes move towards a central portion of the screen, the fourth parameter has a value close to 0.

11. The 3D image rendering method of claim 1, wherein the detecting of the eye coordinates comprises:
acquiring a face image of the user using an image sensor of a mobile apparatus; and
detecting the eye coordinates based on the image sensor by tracking a viewpoint of the face image.

12. A non-transitory computer-readable storage medium storing a program for causing a processor to perform a method comprising:
detecting eye coordinates of positions of eyes of a user from an image of the user;
calculating a first result value by applying a Snell's law formula to first pixels that are a portion of pixels in a single frame corresponding to the eye coordinates;
calculating a second result value by applying a paraxial approximation to the first pixels;
adjusting the eye coordinates to correspond to virtual eye positions that reduce crosstalk caused by refraction of light; and performing 3D image rendering of the eyes based on the adjusted eye coordinates.

13. A three-dimensional (3D) image rendering apparatus comprising:
an image sensor configured to detect eye coordinates of positions of eyes of a user from an image of the user; and
a processor configured to:
calculate a first result value by applying a Snell's law formula to first pixels that are a portion of pixels in a single frame corresponding to the eye coordinates;
calculate a second result value by applying a paraxial approximation to the first pixels;
adjust the eye coordinates to correspond to virtual eye positions based on a difference between the first result value and the second result value that reduce crosstalk caused by refraction of light, and
perform 3D image rendering of the eyes based on the adjusted eye coordinates.

14. The 3D image rendering apparatus of claim 13, wherein the processor is further configured to adjust the eye coordinates within an interpupillary distance (IPD).

15. The 3D image rendering apparatus of claim 13, wherein the processor is further configured to:
determine an evaluation function value based on a difference between the first result value and the second result value;
calculate the virtual eye positions to minimize the evaluation function value; and
adjust the eye coordinates based on the virtual eye positions.

16. The 3D image rendering apparatus of claim 13, wherein the first pixels comprise pixels located at an edge portion of a 3D display.

17. The 3D image rendering apparatus of claim 13, wherein the processor is further configured to:
adjust the eye coordinates based on at least one of a first function defined in advance to adjust X coordinates among the eye coordinates, a second function defined in advance to adjust Z coordinates among the eye coordinates, and a lookup table that stores adjusted eye coordinates corresponding to the eye coordinates in advance.

18. The 3D image rendering apparatus of claim 17, wherein the first function is configured to adjust the X coordinates based on a first parameter that changes based on the Z coordinates and a second parameter that is based on a distance between an image sensor and a central portion of a screen of a 3D display.

19. The 3D image rendering apparatus of claim 18, wherein the first parameter has a value less than or equal to 1, and
wherein when a distance between the eyes and the screen of the 3D display decreases, the first parameter decreases, and when the distance between the eyes and the screen increases, the first parameter increases.

20. The 3D image rendering apparatus of claim 17, wherein the second function is configured to adjust the Z coordinates based on a third parameter and a fourth parameter that change based on the X coordinates.

21. The 3D image rendering apparatus of claim 20, wherein
when the eyes move towards an edge portion of a screen of a 3D display, the third parameter decreases,
when the eyes move towards a central portion of the screen, the third parameter increases, and when the eyes move towards the central portion of the screen, the third parameter has a value close to 1.

22. The 3D image rendering apparatus of claim 20, wherein
when the eyes move towards an edge portion of a screen of a 3D display, the fourth parameter increases,
when the eyes move towards a central portion of the screen, the fourth parameter decreases, and
when the eyes move towards a central portion of the screen, the fourth parameter has a value close to 0.

23. The 3D image rendering apparatus of claim 13, wherein
the image sensor is configured to acquire a face image of the user, and
the processor is further configured to detect the eye coordinates based on the image sensor by tracking a viewpoint of the face image.

24. The 3D image rendering apparatus of claim 13, wherein the 3D rendering apparatus is a mobile apparatus.

25. The 3D image rendering apparatus of claim 13, wherein the processor is further configured to adjust the eye coordinates by minimizing the difference between the first result value and the second result value.

26. The 3D image rendering apparatus of claim 13, wherein the processor is further configured to:
apply the Snell's law formula to only a portion of pixels in a single frame corresponding to the eye coordinates; and
adjust the eye coordinates based on a result of the application of the Snell's law formula to only the portion of pixels in the single frame.

27. A three-dimensional (3D) image rendering method comprising:
receiving eye coordinates of positions of eyes of a user from an image of the user;
calculating a first result value by applying a Snell's law formula to first pixels that are a portion of pixels in a single frame corresponding to the eye coordinates;
calculating a second result value by applying a paraxial approximation to the first pixels;
generating adjusted eye coordinates based on a difference between the first result value and the second result value corresponding to refraction of light passing through a panel from a backlight unit; and
performing 3D image rendering of the eyes based on the adjusted eye coordinates.

28. A three-dimensional (3D) image rendering apparatus comprising:
a processor configured to:
receive eye coordinates of positions of eyes of a user from an image of the user;
calculate a first result value by applying a Snell's law formula to first pixels that are a portion of pixels in the single frame corresponding to the eye coordinates;
calculate a second result value by applying a paraxial approximation to the first pixels;
generate adjusted eye coordinates based on a difference between the first result value and the second result value corresponding to refraction of light passing through a panel from a backlight unit; and
perform 3D image rendering of the eyes based on the adjusted eye coordinates.

\* \* \* \* \*